(12) United States Patent
Takahashi et al.

(10) Patent No.: US 6,279,691 B1
(45) Date of Patent: Aug. 28, 2001

(54) ELECTRIC BRAKING DEVICE

(75) Inventors: Kimio Takahashi; Kazuo Kawase, both of Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/538,243

(22) Filed: Mar. 30, 2000

(30) Foreign Application Priority Data

Apr. 2, 1999 (JP) ................................................. 11-096197

(51) Int. Cl.[7] ................................................. F16D 55/14
(52) U.S. Cl. .................. 188/72.8; 188/71.9; 188/1.11 E; 188/162; 188/196 D; 188/196 V; 192/84.6; 192/84.7
(58) Field of Search ................................. 188/71.7, 71.8, 188/71.9, 72.2, 72.7, 72.8, 158, 162, 156, 196 D, 196 V, 1.11 R, 1.11 E; 192/84.6, 84.7

(56) References Cited

U.S. PATENT DOCUMENTS

| | | | |
|---|---|---|---|
| 5,915,504 | * | 6/1999 | Doricht ................................ 188/72.1 |
| 5,949,168 | * | 9/1999 | Dieckmann et al. ............... 310/75 R |
| 6,173,820 | * | 1/2001 | Blosch et al. ......................... 188/158 |
| 6,176,352 | * | 1/2001 | Maron et al. .................... 188/1.11 E |
| 6,213,256 | * | 4/2001 | Schaffer ............................... 188/71.9 |

FOREIGN PATENT DOCUMENTS 8-510316   10/1996 (JP).
10-504876   5/1998 (JP).

* cited by examiner

Primary Examiner—Robert J. Oberleitner
Assistant Examiner—Bradley King
(74) Attorney, Agent, or Firm—Morgan, Lewis & Bockius LLP

(57) ABSTRACT

A force transmitting and converting mechanism for an electric braking device comprising a gear, a nut, a rotating body, a ramp mechanism, a screw member, and a brake element. The gear is rotated by the electric motor, and the nut disposed being opposed to the gear. The rotating body is disposed between the gear and the nut. The ramp mechanism is operated so that the gear and the nut can be separated from each other by a relative rotation of the gear with the nut. The screw member is screwed to the nut, and the brake element is capable of coming into contact with the screw member. The ramp mechanism integrally rotates the gear and the nut until the brake element comes into contact with the rotating member by a pushing force less than a predetermined value, and the ramp mechanism allows the gear and the nut to rotate relatively with each other when the brake element comes into contact with the rotating member by a pushing force not less than the predetermined value, so that the nut can be moved in a direction of the rotating member.

16 Claims, 3 Drawing Sheets

ELECTRIC BRAKING DEVICE

BACKGROUND OF THE INVENTION

1. Field of the Invention

The present invention relates to an electric braking device in which a brake force is generated when a brake element is pushed to a rotating member by operating an electric motor according to an electric signal, and in which the response property is excellent at the beginning of braking operation and the force transmitting efficiency is high after a brake pad and the rotating member are frictionally engaged with each other.

2. Description of the Related Art

An electric braking device is well known in which an electric motor is operated according to an electric signal so that a brake element (brake pad) is pushed to a rotating member (brake rotor) so that a brake force is generated. An example of the electric braking device is disclosed in JP-W-10-504876.

This electric braking device is composed as follows. Rotation of the electric motor is reduced by the reduction device and converted into a liner motion, so that the brake pad opposed to the brake rotor is moved to the brake rotor so as to conduct braking operation.

In the electric braking device described in the above patent publication, the force transmitting and converting mechanism for converting the torque of the electric motor into a pushing force for pushing the brake pad is composed of a roller screw, the force transmitting efficiency of which is high, which is used instead of a force transmitting and converting mechanism composed of a simple screw and nut. However, compared with the simple screw and nut mechanism, the roller screw mechanism is disadvantageous in that a large space is required for housing the electric motor and speed reduction mechanism, so that it becomes difficult to miniaturize the electric braking device. Further, the roller screw is relatively expensive. Therefore, it is difficult to decrease the cost of the electric braking device.

Another electric braking device is described in JP-W-8-510316.

The electric braking device described in the above patent publication includes a gear transmitting device, which is arranged between the electric motor and the brake pad, for pushing the brake pad to the rotating member (brake rotor). There are provided two clutch mechanisms in this gear transmitting device. When the first clutch mechanism is connected and the second clutch mechanism is disconnected, it is possible to obtain various approach speeds and fastening forces. After that, when the first clutch mechanism is disconnected and the second clutch mechanism is connected, it is possible to obtain a higher fastening force, that is, it is possible to obtain a higher brake force. This braking device is advantageous in that the brake pad can be quickly moved at the beginning of braking operation and further when the clutch is changed over after the braking operation, it is possible to obtain a higher fastening force. However, the above braking device is disadvantageous in that the structure becomes complicated and it is difficult to miniaturize the braking device because the force transmitting and converting mechanism is composed of the gear mechanism and two clutches.

SUMMARY OF THE INVENTION

It is an object of the present invention to solve the above problems and provide an electric braking device including a force transmitting and converting mechanism in which a ramp mechanism is arranged between the electric motor and the brake pad. Due to the above structure, the efficiency of the force transmitting and converting mechanism having the ramp mechanism is higher than that of the screw and nut mechanism, and further it is possible to miniaturize the braking device and decrease the cost compared with the roller screw mechanism. Further, even when the brake pad wears, it can follow the wear smoothly. Furthermore, at the beginning of braking operation in which a longer stroke of the brake pad is required, it is possible to obtain a longer stroke, and it is possible to obtain a strong braking force in the process of braking operation.

The force transmitting and converting mechanism adopted by the electric braking device of the present invention includes: a gear rotated by the rotation of an electric motor; a nut arranged being opposed to this gear; and a rotating body arranged between the gear and the nut. The force transmitting and converting mechanism adopted by the electric braking device of the present invention further includes: a ramp mechanism operated so that the nut can be separated from the gear by the relative rotation of the gear and the nut; a screw member, which is not rotated, screwed to the nut member; and a brake pad arranged in the screw member. The ramp mechanism pushes the gear and nut integrally until the brake pad comes into contact with the brake rotor by a predetermined pushing force. When the brake pad comes into contact with the brake rotor by the predetermined pushing force, the ramp mechanism allows a relative rotation of the nut and gear, so that the nut member can be moved in the direction of the rotating member. In this way, the brake pad can be quickly moved at the beginning of braking operation, and it is possible to obtain a strong fastening force after the braking operation.

In order to accomplish the above object, the present invention adopts an electric braking device comprising a force transmitting and converting mechanism for pushing a rotating member with a brake element by a drive force generated by an electric motor, the force transmitting and converting mechanism including: a gear rotated by the electric motor; a nut arranged being opposed to the gear; a rotating body arranged between the gear and the nut; a ramp mechanism operated so that the gear and the nut can be separated from each other by a relative rotation of the gear with the nut; a screw member, which is not rotated, screwed to the nut; and a brake element operationally coming into contact with the screw member, wherein the ramp mechanism integrally rotates the gear and the nut until the brake element comes into contact with the rotating member by a predetermined pushing force, and the ramp mechanism allows the gear and the nut to rotate relatively with each other when the brake element comes into contact with the rotating member by a pushing force not less than the predetermined pushing force, so that the nut can be moved in a direction of the rotating member.

The ramp mechanism includes: inclined grooves formed on respective faces on which the gear and nut are opposed to each other; and a rotating body held between the inclined grooves, wherein the inclined grooves are formed in such a manner that the depth formed by the inclined grooves gradually becomes shallow when the nut and gear are rotated relatively with each other, and a recess portion for holding the rotating body is formed in the deepest portion of each inclined groove, and a wall portion for prohibiting the rotating body from moving is formed at an end portion of the most shallow portion of each groove.

DETAILED DESCRIPTION OF THE PREFERRED EMBODIMENT

Figure 1:
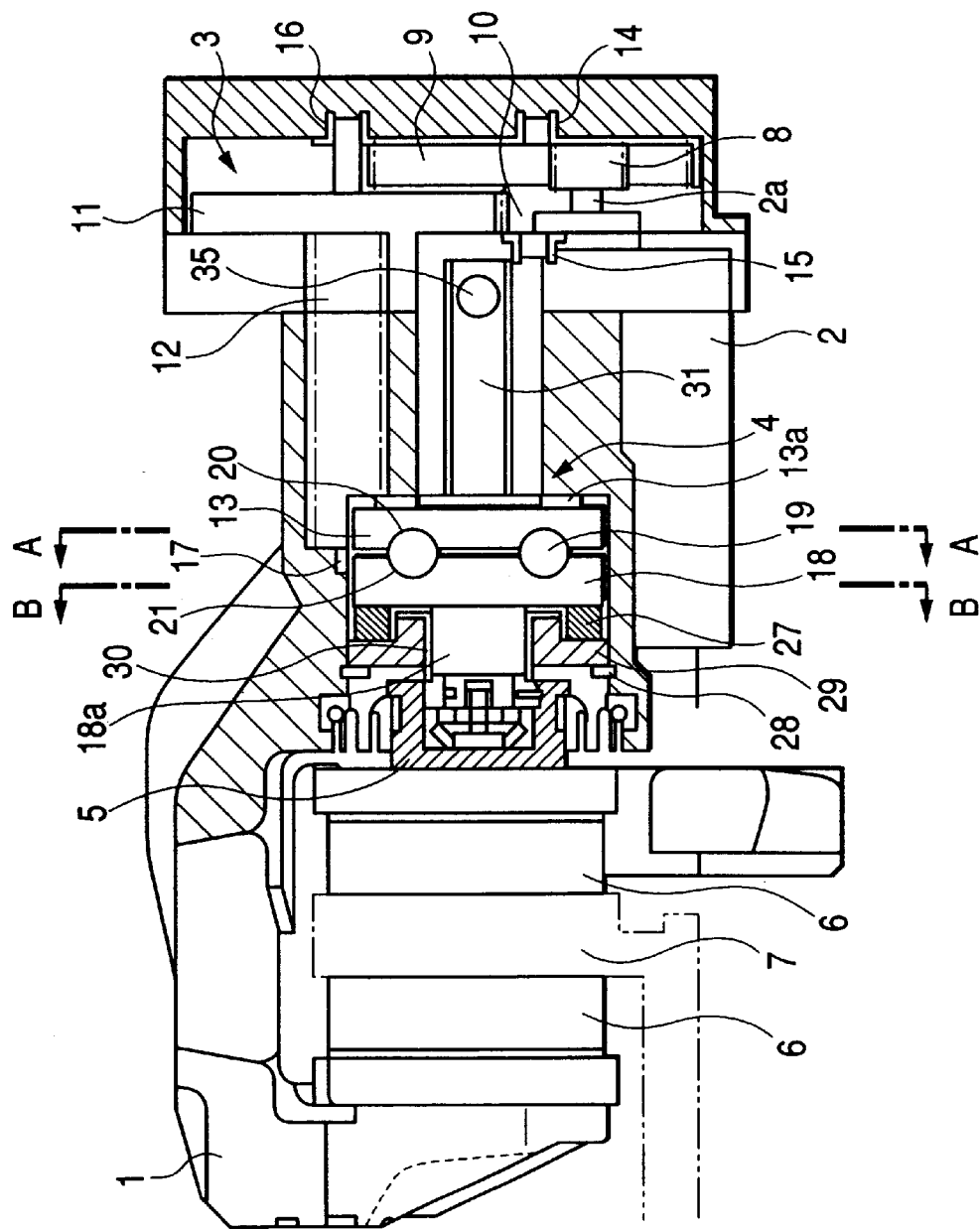
FIG. 1 is a partially cross-sectional view of an electric braking device of an embodiment of the present invention.
Figure 2:
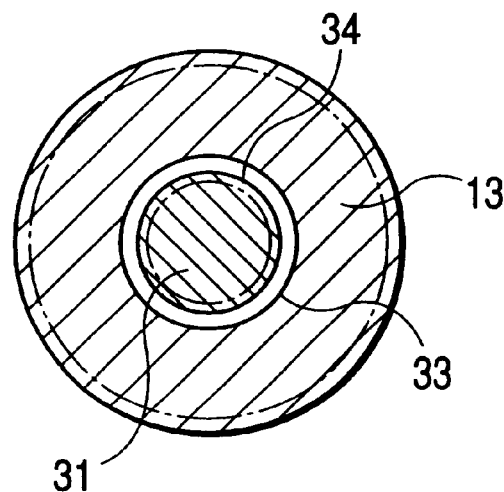
FIG. 2 is a cross-sectional view taken on line A—A in FIG. 1.
Figure 3:
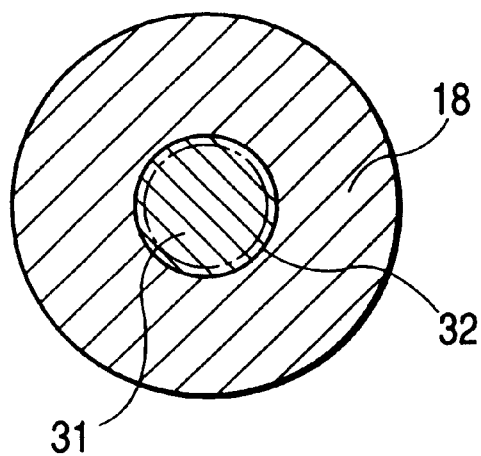
FIG. 3 is a cross-sectional view taken on line B—B in FIG. 1.
Figure 4:
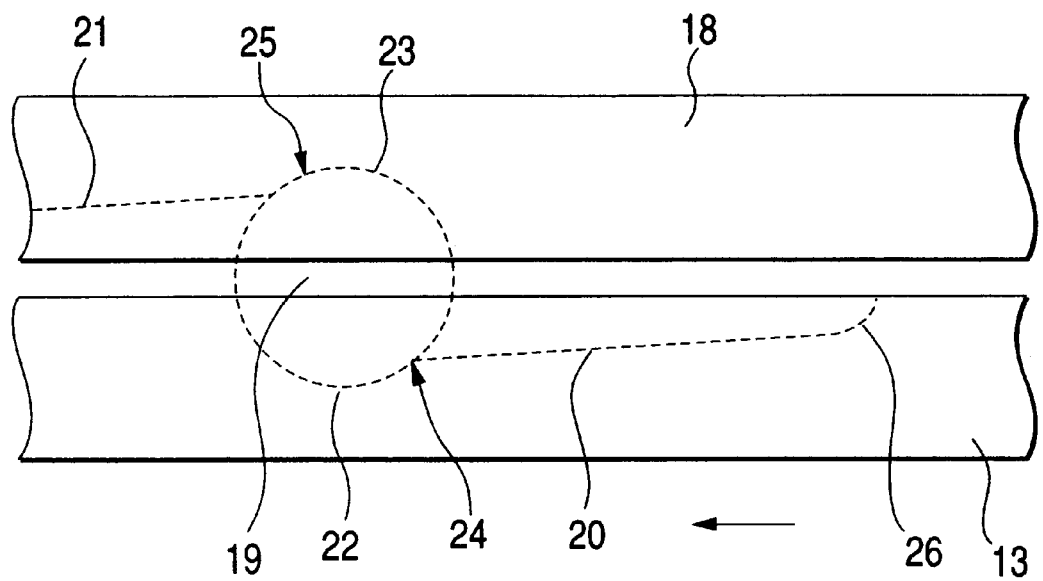
FIG. 4 is a plan view of a ramp mechanism composing a force transmitting and converting mechanism arranged in the electric braking device.
Figure 5:
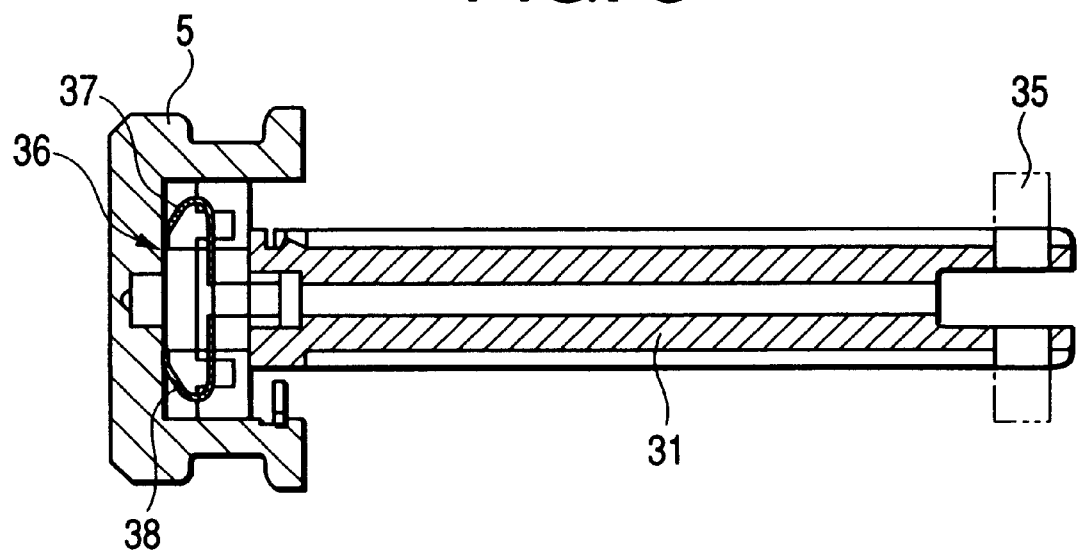
FIG. 5 is a view showing a structure of a switch arranged at a connecting section between a screw member and a pushing member.

Referring to the appended drawings, an embodiment of the present invention will be explained below. FIG. 1 is a partially cross-sectional view of an electric braking device of an embodiment of the present invention. FIG. 2 is a cross-sectional view taken on line A—A in FIG. 1. FIG. 3 is a cross-sectional view taken on line B—B in FIG. 1. FIG. 4 is a plan view of a ramp mechanism composing a force transmitting and converting mechanism arranged in the electric braking device. FIG. 5 is a view showing a structure of a switch, which is arranged at a connecting section between a screw member and a pushing member for keeping brake pad clearance constant.

In FIG. 1, the electric braking device includes a caliper 1 as well known. In the caliper 1, there are provided an electric motor 2 used for braking operation, reduction mechanism 3, force transmitting and converting mechanism 4, and pushing member 5 etc.

A pair of brake pads 6, which compose a frictional member, are respectively arranged in the caliper 1 and the pushing member 5. When these brake pads 6 are moved in the respective directions, the brake rotor 7, which is a rotating member, is held by the brake pads 6, so that a braking force is exerted. Its structure is the same as that of the conventional electric braking device well known.

The electric motor 2 is fixed to the caliper 1. The gear 8 is attached to the output shaft 2a of the electric motor 2. This gear 8 is meshed with the first gear 9 composing the reduction mechanism 3. The first gear 9 is integrally provided with the second gear 10 of small diameter. This second gear 10 is meshed with the third gear 11 of large diameter. This third gear 11 is integrally provided with the fourth gear 12 which is long in the axial direction. A forward end portion of the fourth gear 12 on the left in the drawing is meshed with the gear 13 composing the ramp mechanism described later. The gear 13 comes into contact with the caliper via the bearing 13a. The first 9 and the second gear 10 are supported by the caliper via the bearings 14, 15, and the third 11 and the fourth gear 12 are supported by the caliper via the bearings 16, 17.

As shown in FIGS. 1 and 4, the ramp mechanism includes: a nut 18 arranged being opposed to the gear 13; inclined grooves 20, 21 respectively formed on the faces of the gear 13 and the nut 18 which are opposed to each other; and a ball 19, which is a rotating body, held between both the inclined grooves 20, 21. As shown in FIG. 4, the inclined grooves 20, 21 are formed in such a manner that the depth of each groove gradually becomes shallow when the gear 13 and the nut 18 are relatively rotated from the initial position. At the deepest portions of the grooves 20, 21, there are formed recess portions 22, 23 in which the ball 19 is held. At the connecting points of the recess portions 22, 23 with the inclined grooves 20, 21, there are provided step sections 24, 25 over which the ball 19 can get when a predetermined force is applied to the ball 19. At the end portions of the shallowest sections of the grooves 20, 21, there are provided wall sections 26 for prohibiting the ball from moving, wherein the wall section on the nut side is not shown in the drawing. The ball 19 is held between he inclined grooves 20, 21 opposed to each other. In this way, the initial state shown in FIG. 4 is made. In this connection, it is possible to use a cylindrical rotating body instead of the ball 19.

In FIG. 1, the nut 18 is pushed to the gear 13 side (the right in the drawing) by the elastic body 27. This elastic body 27 is arranged between the support member 29, which is held by the caliper with the stop spring 28, and the nut 18. At the center of the support member 29, there is provided a bearing 30, and an outer circumference of the small diameter section 18a, which is formed integrally with the nut 18, is slidably held by this bearing 30. As shown in FIG. 3, the screw member 31 is screwed 32 to the center of the nut 18. As shown in FIG. 2, the screw member 31 penetrates the hole 33 formed in the gear 13. Between the gear 13 and the screw member 31, there is formed a clearance 34 so that both members can not come into contact with each other.

At the right end of the screw member 31 in the drawing, the screw member 31 is stopped from rotating by the rod 35 for stopping rotation, and at the forward end (the left end in the drawing) of the screw member 31, there is provided a pushing member 5.

As shown in FIG. 5, between the screw member 31 and the pushing member 5, there is provided a switch mechanism 36 for setting the pad clearance.

Terminals 37, 38 composing the switch mechanism 36 are connected to an electronic control unit by lead wires not shown in the drawing. The terminals 37, 38 are fixed to the screw member 31 under the condition of electrical insulation. The terminals 37, 38 are not contacted with each other due the clearance formed between the pushing member 5 and the terminals 37, 38 when the brake device is not operated. When the brake device is operated, the terminals 37, 38 are contacted with the pushing member 5, so that the terminals 37, 38 are short-circuited to each other by the pushing member 5 made of conductive material, and the switch is turned on.

Operation of the electric braking device composed as described above will be explained below.

When a driver puts on a brake pedal not shown in the drawing and the leg-power of the driver is detected by a leg-power sensor not shown in the drawing, an electrical current, the intensity of which is proportional to the leg-power, is made to flow in the electric motor 2 according to a signal sent from the electronic control unit not shown in the drawing. Therefore, the output shaft 2a of the electronic motor 2 is rotated, and the gear 8 mounted on the output shaft 2a is rotated. When the gear 8 is rotated, the first 9 and the second gear 10 of the reduction mechanism 3 are rotated, and further the third gear 11 of large diameter meshed with the second gear 10 is rotated. Accordingly, the fourth gear 12, which is provided integrally with the third gear 11, is rotated.

Due to the rotation of the fourth gear 12, the gear 13 in the ramp mechanism composing the force transmitting and converting mechanism 4 is rotated in the direction of an arrow.

At the beginning of brake operation, the brake clearance between the brake pad 6 and the rotor 7 is not filled, and a pushing force of the gear 13 to the nut 18 is small. Therefore, it is impossible for the ball 19 to get over the step portions 24, 25, and the gear 13 and the nut 18 are rotated integrally with each other. Rotation of the nut 18 is stopped by the rod 35 for stopping the rotation, and the screw member 31 screwed to the nut 18 is moved to the left in FIG. 1. When the screw member 31 is moved to the left in the drawing, an end portion of the screw member 31 comes into contact with the inner face of the pushing member 5. Further, the pushing member 5 and the brake pad 6 are moved, so that the brake pad 6 is pushed against the brake rotor 7. Due to the reaction force caused when the brake pad 6 is pushed against the brake rotor 7, the caliper 1 is moved to the right. Therefore, the brake pad 6 on the other side is also pushed onto the rotor 7. In this way, the brake is exerted by both the brake pads. Under the condition that the brake is operated, two terminals 37, 38 attached to the screw member 31 come into contact with the pushing member 5, and the state of conduction can be obtained.

When the brake pushing force is increased, that is, when the pushing force of the screw member 31 to the nut 18 is increased, rotation of the nut is stopped, and the ball 19 gets over the step portions 24, 25 in the recess portions 22, 23 at the deepest portions of the inclined grooves 20, 21 by the rotation of the gear 13 to which torque is transmitted from the electric motor 2. Therefore, the ball 19 moves into the inclined grooves 20, 21. By the action caused by the ball and grooves, the nut 18, which is not rotated, is moved to the left in the drawing while the elastic body 27 is being deformed, and the screw 31 is moved to the left, so that a higher braking force can be obtained. During this period of time, it is possible to obtain a predetermined brake force proportional to the leg-power of the brake pedal by the electric current sent to the electric motor in proportion to the leg-power of the brake pedal.

When the brake pedal is released, the electric motor 2 is reversed, so that the first gear 9 to the fourth gear 12 are reversed, and the gear 13 is reversed. When the brake is released, the rolling resistance of the ball 19 is lower than the frictional resistance between the screw member 31 and the nut 18. Therefore, first, while the ball 19 is moving in the inclined grooves 20, 21, the braking force is decreased. After that, when the ball 19 is moved to the deepest recess portions 22, 23 in the inclination groove, the gear 13 and the nut 18 are rotated integrally with each other, and the screw member 31 is moved to the right in the drawing, so that the brake can be released.

When the brake pedal is released, the screw member 31 is returned. Then the pushing member 5 and the screw member are separated from each other, and the terminals 37, 38 are separated from the pushing member. Then, the switch is turned off, and the supply of electrical current from electronic control unit ECU to the electric motor 2 is stopped. Due to the stoppage of the electric motor 2, the brake clearance can be always held at a predetermined value. That is, even when the brake pad is worn out, after the operation of the brake, the brake is released and the electric motor 2 is reversed, so that the screw member 31 is returned to the initial position and the terminals 37, 38 are separated from the pushing member 5 and the electric motor is stopped. Due to the foregoing, it is possible to obtain a predetermined brake clearance at all times irrespective of the state of wear of the brake pad.

When the gear 13 is being rotated during an increase in the braking force, the ball 19 comes to the shallowest portions of the inclined grooves 20, 21 and comes into contact with the wall face 26, so that the ball 19 is prohibited from moving. As a result, the gear 13 and the nut 18 are integrated with each other and rotated integrally. Due to the rotation of the nut 18, the screw member 31 is further moved to the left in the drawing, so that the brake pushing force can be enhanced.

In this connection, in this embodiment, after the brake pedal has been released, the brake clearance can be kept in an appropriate condition by the actions of the ramp mechanism and the switch mechanism, however, it is possible to omit the switch mechanism when necessary.

As described above, according to the present invention, the brake pushing force can be enhanced by the action of the screw mechanism composed of the nut and the screw member at the beginning of braking operation, and also the brake pushing force can be enhanced by the action of the ramp mechanism after a predetermined braking force has been generated. An amount of movement of the brake pad 6 by the pushing member 5 per unit rotation of the electric motor owing to the ramp mechanism is set to be smaller than that of the brake pad 6 by the pushing member 5 per unit rotation of the electric motor owing to the screw mechanism. Therefore, the brake clearance between the brake pad and the brake rotor can be quickly filled at the beginning of braking operation. After a predetermined braking force has been generated, the ramp mechanism, the mechanical efficiency of which is high, can push the brake pad by a stronger force than the force of pushing the brake pad generated by the screw mechanism. Accordingly, the electric motor can be miniaturized.

As described above in detail, according to the present invention, since the ramp mechanism is adopted for the force transmitting and converting mechanism of an electric braking device, it is possible to provide the following effects. The force transmitting efficiency of the ramp mechanism is higher than that of the screw mechanism. In a region at the beginning of braking operation in which a stroke is required, it is possible to obtain a long stroke. The response property is excellent. During the process of braking operation, it is possible to obtain a strong braking force by a simple structure.

While only a certain embodiment of the invention has been specifically described herein, it will be apparent that numerous modifications may be made thereto without departing from the spirit and scope of the invention.

The present invention is based on Japanese Patent Application No. Hei. 11-96197 which is incorporated herein by reference.

What is claimed is:

1. An electric braking device comprising a force transmitting and converting mechanism for pushing a rotating member by a drive force generated by an electric motor, said force transmitting and converting mechanism including:
   a gear rotated by the electric motor;
   a nut disposed being opposed to the gear;
   a rotating body disposed between the gear and the nut;
   a ramp mechanism operated so that the gear and the nut can be separated from each other by a relative rotation of the gear with the nut;
   a screw member screwed to the nut and not rotated; and
   a brake element being capable of coming into contact with the screw member,
   wherein the ramp mechanism integrally rotates the gear and the nut when the brake element comes into contact with the rotating member by a pushing force less than a predetermined value, and the ramp mechanism allows the gear and the nut to rotate relatively with each other when the brake element comes into contact with the rotating member by a pushing force not less than the predetermined value, so that the nut can be moved in a direction of the rotating member.

2. The electric braking device according to claim 1,
wherein the ramp mechanism of said force transmitting and converting mechanism includes inclined grooves formed on respective faces on which the gear and nut are opposed to each other and holding the rotating body therebetween, and wherein the inclined grooves are formed in such a manner that the depth formed by the inclined grooves gradually becomes shallow when the nut and gear are rotated relatively with each other, a recess portion for holding the rotating body is formed in the deepest portion of each inclined groove, and a wall portion for prohibiting the rotating body from moving is formed at an end portion of the most shallow portion of each groove.

3. The electric braking device according to claim 1, wherein the rotating body of said force transmitting and converting mechanism is a ball.

4. The electric braking device according to claim 1, wherein the rotating body of said force transmitting and converting mechanism is a cylindrical rotating body.

5. The electric braking device according to claim 1, wherein said force transmitting and converting mechanism further includes a pushing member disposed between the screw member and the brake element.

6. The electric braking device according to claim 1, wherein said force transmitting and converting mechanism further includes a switch mechanism setting a clearance between the brake element and the rotating member.

7. The electric braking device according to claim 6, wherein said force transmitting and converting mechanism further includes a pushing member disposed between the screw member and the brake element, and the switch mechanism includes terminals which are apart from the pushing member when the brake device is not operated, and which are contacted with the pushing member when the brake device is operated.

8. The electric braking device according to claim 1, wherein an amount of movement of the brake element per unit rotation of the electric motor owing to the ramp mechanism is smaller than that of the brake element per unit rotation of the electric motor owing to the screw member.

9. A force transmitting and converting mechanism for pushing a rotating member by a drive force generated by an electric motor, said force transmitting and converting mechanism including:

a gear rotated by the electric motor;

a nut disposed being opposed to the gear;

a rotating body disposed between the gear and the nut;

a ramp mechanism operated so that the gear and the nut can be separated from each other by a relative rotation of the gear with the nut;

a screw member screwed to the nut and not rotated; and a brake element being capable of coming into contact with the screw member, wherein the ramp mechanism integrally rotates the gear and the nut when the brake element comes into contact with the rotating member by a pushing force less than a predetermined value, and the ramp mechanism allows the gear and the nut to rotate relatively with each other when the brake element comes into contact with the rotating member by a pushing force not less than the predetermined value, so that the nut can be moved in a direction of the rotating member.

10. The force transmitting and converting mechanism according to claim 9, wherein the ramp mechanism includes inclined grooves formed on respective faces on which the gear and nut are opposed to each other and holding the rotating body therebetween, and wherein the inclined grooves are formed in such a manner that the depth formed by the inclined grooves gradually becomes shallow when the nut and gear are rotated relatively with each other, a recess portion for holding the rotating body is formed in the deepest portion of each inclined groove, and a wall portion for prohibiting the rotating body from moving is formed at an end portion of the most shallow portion of each groove.

11. The force transmitting and converting mechanism according to claim 9, wherein the rotating body of said force transmitting and converting mechanism is a ball.

12. The force transmitting and converting mechanism according to claim 9, wherein the rotating body of said force transmitting and converting mechanism is a cylindrical rotating body.

13. The force transmitting and converting mechanism according to claim 9, further including a pushing member disposed between the screw member and the brake element.

14. The force transmitting and converting mechanism according to claim 9, further including a switch mechanism setting a clearance between the brake element and the rotating member.

15. The force transmitting and converting mechanism according to claim 14, further including a pushing member disposed between the screw member and the brake element, and wherein the switch mechanism includes terminals which are apart from the pushing member when the brake device is not operated, and which are contacted with the pushing member when the brake device is operated.

16. The force transmitting and converting mechanism according to claim 9, wherein an amount of movement of the brake element per unit rotation of the electric motor owing to the ramp mechanism is smaller than that of the brake element per unit rotation of the electric motor owing to the screw member.

* * * * *